United States Patent [19]

Tsukamoto

[11] Patent Number: 4,994,829
[45] Date of Patent: Feb. 19, 1991

[54] WATERPROOF CAMERA AND LENS MOUNT THEREFORE

[75] Inventor: Masaaki Tsukamoto, Kawasaki, Japan

[73] Assignee: Nikon Corporation, Tokyo, Japan

[21] Appl. No.: 436,687

[22] Filed: Nov. 15, 1989

[30] Foreign Application Priority Data

Jul. 10, 1989 [JP] Japan .................................. 1-175627

[51] Int. Cl.⁵ ....................... G03B 17/08; G03B 17/12
[52] U.S. Cl. ...................................... 354/64; 354/286; 350/257
[58] Field of Search ...................... 354/64, 286, 195.1, 354/455; 350/255, 257, 588, 589

[56] References Cited

U.S. PATENT DOCUMENTS

| | | | |
|---|---|---|---|
| 3,001,462 | 9/1961 | D'Oplinter | 354/195.1 |
| 3,162,106 | 12/1964 | D'Oplinter | 354/64 |
| 4,168,897 | 9/1979 | Gates | 354/286 |
| 4,391,488 | 7/1983 | Ishizaka et al. | 350/257 |
| 4,420,239 | 12/1983 | Yasuyuki et al. | 350/257 |
| 4,766,453 | 8/1988 | Shiokama et al. | 354/286 |

FOREIGN PATENT DOCUMENTS

39-5519 4/1964 Japan .
63-280229 11/1988 Japan .

Primary Examiner—A. A. Mathews
Attorney, Agent, or Firm—Shapiro and Shapiro

[57] ABSTRACT

A waterproof camera having a detachable imaging lens system comprises a lens inner tube for holding an imaging lens, a watertight optical member for covering a front plane of the imaging lens, a lens outer tube for holding the watertight optical member and supporting the lens inner tube to permit relative displacement by a predetermined distance along an optical axis only, an inner mechanism support having a camera body mechanism including at least a film holder, an outer housing for housing the inner mechanism support therein, a first bayonet mount provided in the outer housing for removably supporting one end of the lens outer tube, a second bayonet mount fixed to the inner mechanism support to support the lens inner tube and having a mount reference plane contactable to a mount reference plane of the lens inner tube, spring means provided between the lens outer tube adn the lens inner tube for biasing the lens inner tube when the lens outer tube is mounted to the outer housing through the first bayonet mount so that the mount reference plane of the lens inner tube is pressed and contacted to the mount reference plane of the second bayonet mount, and waterproof seal means provided between the lens outer tube and the first bayonet mount.

9 Claims, 8 Drawing Sheets

WATERPROOF CAMERA AND LENS MOUNT THEREFORE

BACKGROUND OF THE INVENTION

1. Field of the Invention

The present invention relates to a waterproof camera, and more particularly to a waterproof camera in which an imaging lens is mounted on a camera body and a lens mount mechanism therefor.

2. Related Background Art

Figure 14:
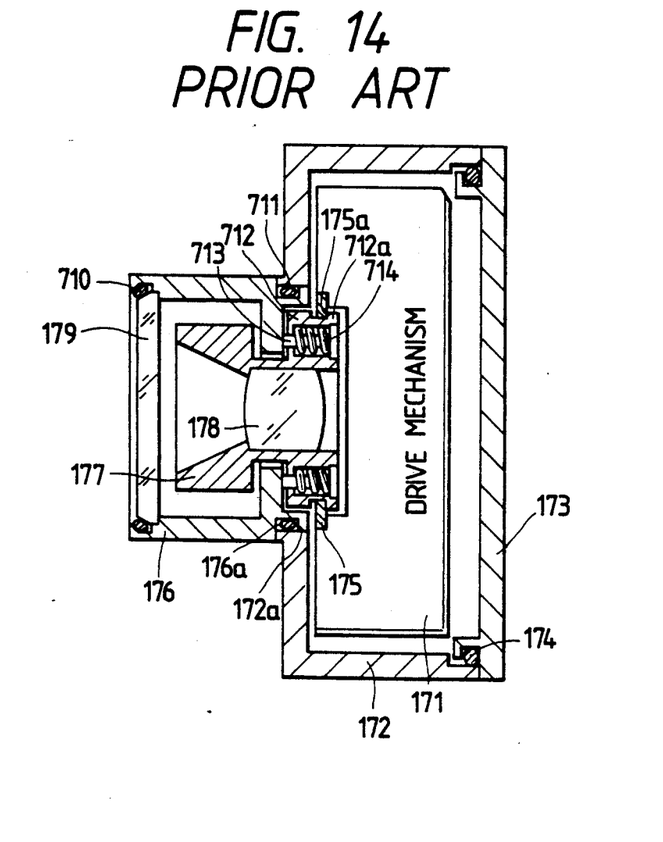
FIG. 14 shows a sectional view of a prior art waterproof camera.

A lens mount mechanism for an exchangeable lens of a waterproof camera is disclosed in Japanese patent publication No. 39- 5519. A waterproof camera having a structure shown in FIG. 14 which is a rear lid open/close type with the known lens mount mechanism has also been known. In FIG. 14, a drive mechanism unit 171 is housed in an outer housing 172 so that it is not affected even if the outer housing 172 is deformed by a pressure, and a clearance between the outer housing 172 and a rear lid 173 rotatably pivoted thereto is sealed against water by an O-ring 174. A mount 175 on which a lens inner tube 177 which holds the lens is provided on the drive mechanism unit 171. An opening 172a is provided on a front plane of the outer housing 172.

On the other hand, an imaging lens bodytube is constructed by a lens outer tube 176 and the lens inner cylinder 177. The lens inner tube 177 comprises an imaging lens 178, a focus adjusting mechanism (not shown) and an iris adjusting mechanism. The lens outer tube 176 is constructed in an anti-pressure and waterproof structure, and a waterproof glass 179 is mounted on a front opening by an O-ring 710 so that it is sealed against water. An O-ring 711 is fitted to a peripheral groove 176a formed in a periphery of a rear opening of the lens outer tube 176. Thus, when the lens bodytube is mounted to the camera body, a clearance between the lens outer tube 176 and the outer housing 172 is sealed against water. A lens mount 712 is fixed to the lens inner tube. The lens mount 712 is supported to be movable along an optical axis by a plurality of shafts 713 mounted on the lens outer tube 176. Compressed coiled springs 714 wound around the shafts 713 bias the lens outer tube 176 to a direction to pull the mount 712. When the lens is mounted, a bayonet 712a of the lens mount 712 engages with bayonet pawls 175a of the body mount 175 and the lens inner tube 77 is champed to the body mechanism 71 by the biasing forces of the compressed coiled springs 714. In this manner, the body mechanism 171 and the lens inner tube 177 are coupled to each other and they are not affected even if the lens outer tube 176 is deformed by the water pressure so that good photographing function is maintained.

However, the prior art waterproof camera described above has the following problems.

(1) Since the fitting area between the lens outer lube 176 and the outer housing opening 172a is of waterproof structure by the O-ring 711 only, if an external force which is transverse to the optical axis and which is larger than the biasing forces of the compressed coiled springs 714 is applied, the lens outer tube will be inclined with respect to the outer housing 172. If an air pressure in the camera is higher than the external pressure and higher than the biasing forces of the compressed coiled springs 714, the lens outer tube 176 will be raised from the outer housing 172. In any of the above cases, the waterproof sealing effect by the O-ring 711 is not perfect and there is a risk of water leakage.

(2) The mounting of the lens mount 712 to the body mount 175 is maintained by the biasing forces of the compressed coiled springs 714. If the lens outer tube 176 is inclined, the pressing forces by the compressed coiled springs 714 are ununiform from point to point and the mounting of the lens mount 712 is unstable. In a recent camera in which electronization is very much introduced and electronic circuits are provided in lens and camera body and signals are transmitted through connectors in the respective mount, the instability of the mounting of the lens mount causes the instability of connection of the connectors. This may cause a malfunction. In order to prevent it, the forces of the compressed coiled springs 714 may be increased so that the lens outer tube 176 is hard to be inclined. However, if the biasing forces of the springs are too large, the body mount 175 is deformed, which will adversely affect to a focusing precision of the imaging lens.

(3) When the lens bodytube is mounted to the camera body, it is difficult to determine whether the lens mount 712 is correctly mounted at the predetermined position relative to the body mount 175 because of a frictional force by the O-ring 711. The connectors for electrically connecting the lens bodytube and the camera body are provided in the mounts in order to transmit various signals therebetween. Accordingly, if the lens bodytube is not correctly mounted at the predetermined position relative to the camera body, a malfunction may occur. If the camera is used in an inperfect mounting condition, the lens bodytube may be dropped off the camera body, which will cause water introduction.

SUMMARY OF THE INVENTION

It is, therefore, an object of the present invention to provide a lens mount of a waterproof camera which solves the problems encountered in the prior art waterproof camera, which prevents water introduction from the lens mount and defocusing even if an internal pressure of the camera changes or an external pressure is applied to the camera, and which permits the mounting of the lens bodytube to the camera body in a simple and positive manner.

In order to achieve the above object, the waterproof camera of the present invention comprises a lens inner tube for holding an imaging lens, a watertight optical member for covering a front plane of the imaging lens, a lens outer tube for holding the watertight optical member and supporting the lens inner tube to permit relative displacement by a predetermined distance along an optical axis only, an inner mechanism support having a camera body mechanism including at least a film holder, an outer housing for housing the inner mechanism support therein, a first bayonet mount provided in the outer housing for removably supporting one end of the lens outer tube, a second bayonet mount fixed to the inner mechanism support to support the lens inner tube and having a mount reference plane contactable to a mount reference plane of the lens inner tube, spring means provided between the lens outer tube and the lens inner tube for biasing the lens inner tube when the lens outer tube is mounted to the outer housing through the first bayonet mount so that the mount reference plane of the lens inner tube is pressed and contacted to the mount reference plane of the second bayonet mount, and waterproof seal means provided between the lens outer tube and the first bayonet mount.

In accordance with the waterproof camera of the present invention, when the outer housing of the camera body and the lens outer tube of the imaging lens are coupled, the inner mechanism support of the camera body and the lens inner tube of the imaging lens are coupled by a stronger biasing force than that in the prior art waterproof camera. Accordingly, even if an external pressure is applied to the lens outer tube, the coupling status of the inner mechanism support and the lens inner tube is not affected and the coupling is positively sealed against water. Further, no defocusing will occur.

Other objects, features and advantages of the present invention will be apparent from the following detailed description taken in conjunction with the accompanying drawings.

DESCRIPTION OF THE PREFERRED EMBODIMENTS

Figure 1:
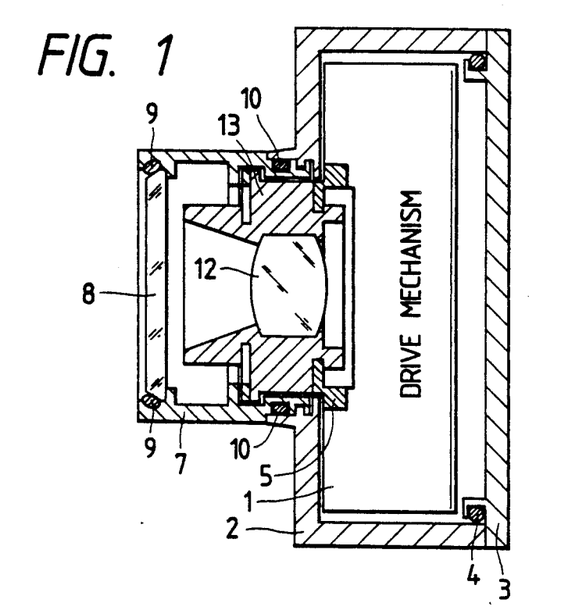
FIG. 1 shows a sectional view of a waterproof camera in accordance with a first embodiment of the present invention.
Figure 2:
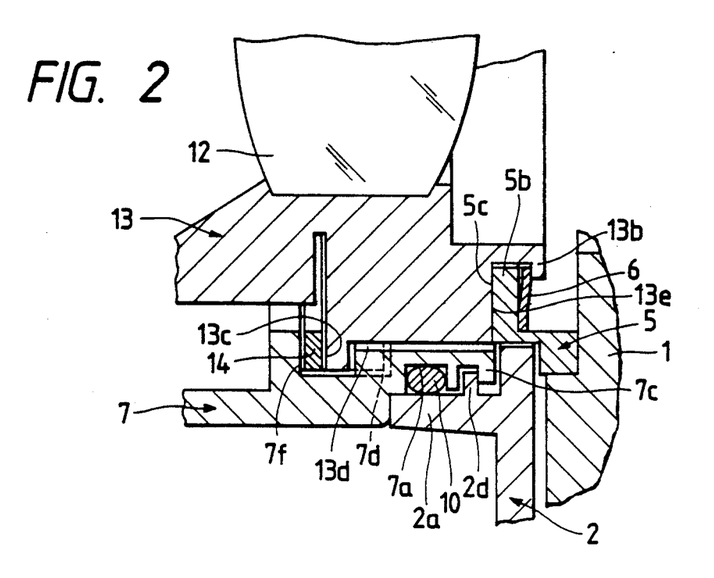
FIG. 2 shows a partial enlarged view of a lens mount shown in FIG. 1.

FIG. 1 shows a first embodiment of a waterproof camera of the present invention with a lens bodytube mounted on a camera body, and FIG. 2 shows an enlarged view of a coupling portion of the lens bodytube and a camera body.

In FIG. 1, a drive mechanism 1 of the camera is housed in and supported by a waterproof and pressure-proof camera body which comprises an outer casing 2, a rear lid 3 and an O-ring 4 therebetween for sealing against water so that it is supported in such a way that it is not affected even if the outer casing 2 or the rear lid 3 is deformed by an external pressure. The drive mechanism 1 has a film hold mechanism for holding a film at a predetermined position behind the lens, a film wind-up mechanism and a shutter mechanism.

An inner mount 5 for mounting an imaging lens is provided on a front of the drive mechanism 1. In FIG. 2, the inner mount 5 has two inner bayonet pawls 5a and 5b, and a plurality of leaf springs 6 for press-engaging an inner tube mount 13 of the lens bodytube to a mount reference plane 5c of the inner mount 5.

An outer mount 2a for mounting the lens bodytube is provided on the front of the outer casing 2, and a waterproof seal having an O-ring 10 and two outer bayonet pawls 2c and 2d are provided.

Figure 3:
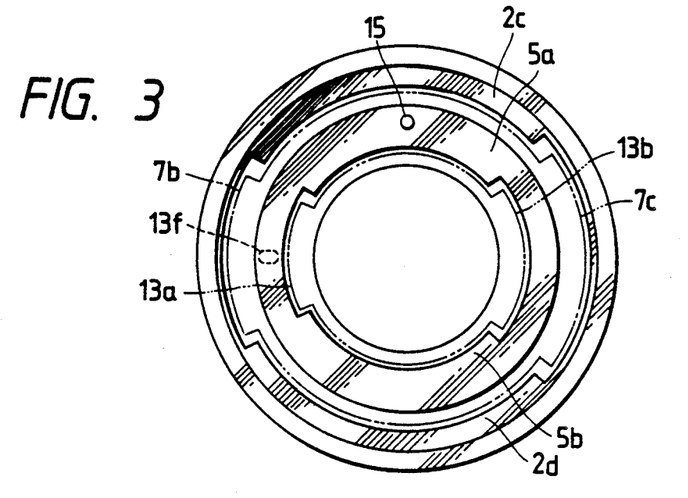
FIG. 3 shows a plan view of a bayonet pawl of the lens mount before a lens bodytube is mounted.

The structure of the lens bodytube is now explained. In FIG. 1, a waterproof glass 8 is provided on a front opening of the lens outer tube 7, and the O-ring 9 seals against water between the outer tube 7 and the waterproof glass 8. A mount having a peripheral groove 7a for mounting the O-ring 10 and the two bayonet pawls 7b and 7c for engaging with the outer bayonet pawls 2c and 2d shown in FIG. 3 is provided in the rear of the outer tube 7. The imaging lens 12, an iris control mechanism (not shown) and a focus control mechanism are arranged in the lens inner tube 13, and bayonet pawls 13a and 13b which engage with the bayonet pawls 5a and 5b through the bayonet spring 6 are provided on the mount as shown in FIG. 3. A ring-shaped leaf spring 14 is held between an edge of a step 7f formed in the inner periphery of the outer tube 7 and a projecting end plane 13c of the inner tube 13. The edge 7f of the step of the outer tube 7 and the projecting end plane 13c of the inner tube 13 are loaded by the ring-shaped leaf spring 14 so that they are separated from each other along an optical axis.

A recess 7d is formed in the mount of the outer tube 7, and a projection 13d is formed in the mount of the inner tube 13. The fit to each other to define a relative rotation with respect to the outer tube 7. The inner tube 13 is movable relative to the outer tube 7 by a certain distance along the optical axis. The amount of displacement is selected in accordance with a distance required for the bayonet pawls to engage with each other without interference.

Figure 4:
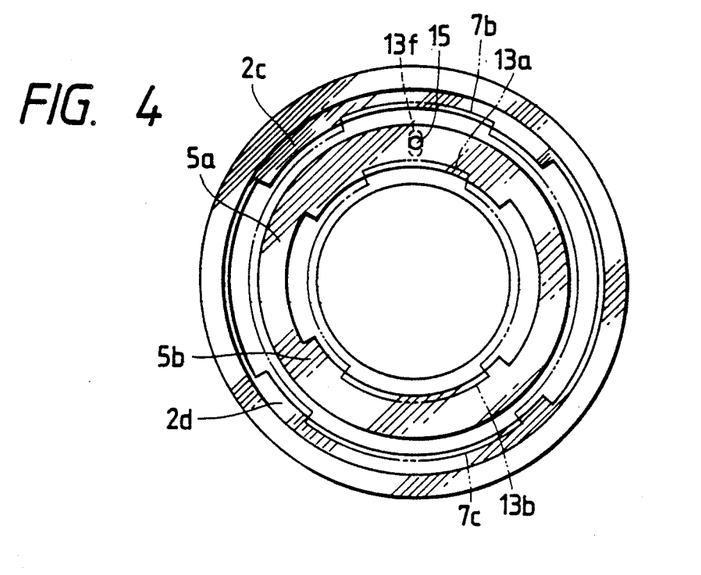
FIG. 4 shows a plan view of the bayonet pawl of the lens mount immediately after the mounting of the lens bodytube.
Figure 5:
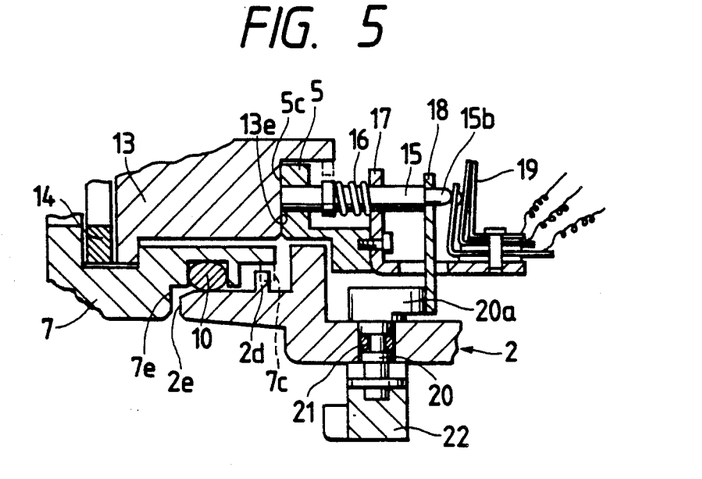
FIG. 5 shows a sectional view of a lens bodytube lock unit of the lens mount before the lens bodytube is mounted.
Figure 6:
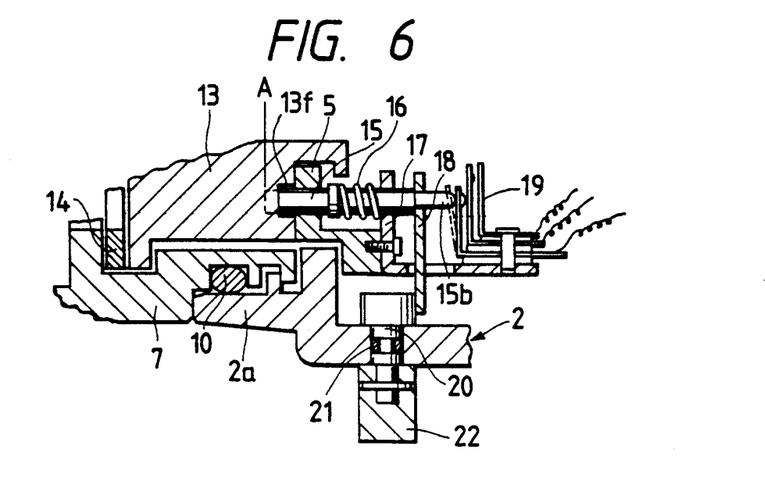
FIG. 6 shows a sectional view of the lens bodytube lock unit of the lens mount immediately after the lens bodytube has been mounted.

FIGS. 3 and 5 show a mutual relationship of the bayonet pawls, and FIGS. 4 and 6 show a relationship after the engagement.

As shown in FIG. 5, a lock pin 15 is provided on the mount 5 of the camera body movably along the optical axis. A recess 13f with which the lock pin 15 is to engage is formed on an end plane 13e of the mount 13. When the lens bodytube is mounted, it is turned to a position shown in FIG. 4 at which it faces the lock pin 15. In the mount status of the lens bodytube shown in FIGS. 4 and 6, the tip end of the lock pin 15 falls into the recess 13f to lock the lens bodytube against the rotation.

In FIGS. 5 and 6, the lock pin 15 extends through the mount 5 and an axial hole formed in the support member 17, and it is biased leftward in FIGS. 5 and 6 by the spring 16. A cam lever 18 is fixed to the lock pin 15 and abuts against a cam surface 20a formed at one end of a cam shaft 20. The cam shaft 20 is rotatably supported by the outer casing 2, and an O-ring 21 is mounted in a middle peripheral groove of the cam shaft 20 to seal against water between the cam shaft 20 and the outer casing 2. A lens removal lever 22 is fixed to the other end of the cam shaft 20. A switch 19 is provided on a bent support member 17 at the other end 15b of the lock pin 15, and it is connected to a control circuit in the drive mechanism 1.

The mount operation of the lens bodytube to the camera body is now explained.

The relationship between the bayonet pawls 5a, 5b, and 13a, 13b, 2c, 2d and 7b, 7c in the state shown in FIG. 5 is shown in FIG. 3. The lock pin 15 and the recess 13f are not engaged. Under this state, when the outer tube 7 is pressed rightward against a pressing force of the spring 14, the mount of the outer tube 7 is inserted into the outer mount 2a of the outer casing 2, and the O-ring 10 is elastically deformed to seal the space therebetween.

The end plane 13e of the mount 13 is pressed to the mount plane 5c by the force of the spring 14 so that it presses the lock pin 15 rightward in FIG. 5. Thus, the switch 19 is turned on. In the state of FIG. 5, the outer bayonet pawls 2c and 2d and the bayonet pawls 7b and 7c interface in the rotating direction so that the lens bodytube cannot be rotated. However, when the outer tube 7 is further pressed rightward in FIG. 5 against the force of the spring 14, the interference is totally removed at a point when the end plane 7e of the outer tube 7 abuts against the end plane 2e of the outer casing 2 and the lens bodytube is now rotatable.

In the first embodiment, the rotation angle required for the mounting of the lens bodytube is 90 degrees, when the lens bodytube is rotated by 90 degrees from the position where the end planes 7e and 2e abut against each other, the mount completion state shown in FIG. 4 is attained. The bayonet pawls 13a and 5a, 13b and 5b, 7b and 2c and 7c and 2d engage with each other, and one end 15a of the lock pin 15 falls into the recess 13f of the mount 13 as shown in FIG. 6 by the biasing force of the spring 16 so that the lens inner tube (13) and the outer tube 7 are locked against the rotation. The bayonet pawl 6 presses the bayonet pawls 13a and 13b rightward in FIG. 2 to make the end plane 13e to contact to the mount reference plane 5c. As a result, the inner tube 13 and the drive mechanism 1 are integrated in the rotation direction and the optical axis direction. As shown in FIG. 4, the bayonet pawls 7b and 7c, and the bayonet pawls 2c and 2d are also engaged with each other and the outer tube 7 is engaged with and held by the outer casing 2.

When the lens bodytube is not mounted on the camera body, the lock pin 15 projects to the broken line position A of FIG. 6 by the biasing force of the spring 16 so that the switch 19 is in an off-state with all contacts opened. When the lens bodytube is inserted into the outer mount 2a as shown in FIG. 5, the switch 19 is turned to a first on-state with three contacts closed. In the complete mount position shown in FIG. 6, the switch 19 is turned to a second on-state with two closed and separate signals are transmitted to the drive mechanism 1.

When the lens bodytube is to be removed from the camera body, the lens removal lever 22 is rotated, the cam lever 18 is pushed rightward by the cam surface 20b of the cam shaft 20 to release the engagement of the lock pin 15 and the recess 13f, and the lens is rotated in the opposite direction to that when the lens is mounted. The lock pin 15, the recess 13f, the spring 16 and the switch 19 form lens removal detection means.

In accordance with the first embodiment of the present invention;

(1) Since the mount of the inner tube 13 of the lens is press-contacted to the inner mount 5 of the camera body by the spring 6, a force sufficient to hold the inner tube 13 can be applied to the spring 6 and the biasing force of the spring 6 acts as an inner force to couple the mount 5 and the mount of the inner tube 13. Therefore, there is no affect to the focusing precision due to the increase of the biasing force of the spring as has been in the prior art apparatus and the lens inner tube 13 can be exactly mounted on the camera mount.

(2) The outer tube 7 and the outer casing 2 are integrated by coupling the outer tube mount to the outer mount 2a of the outer casing 2 when the mounting of the lens is completed, by providing the mount on the lens outer tube 7. Accordingly, even if an external pressure is applied to the outer tube 7 or the internal pressure increases, the outer tube 7 is not inclined or floated and the waterproof sealing is positively effected.

(3) Since the engagement of the mount of the lens outer tube and the outer mount 2a of the outer casing 2 of the camera, and the engagement of the mount 13 of the inner tube of the lens and the inner mount 5 of the camera are done simultaneously by one operation, the lens can be easily mounted and removed.

(4) Since the ring-shaped leaf spring 14 loads the lens inner tube 13 and the lens outer tube 7 in the opposite directions along the optical axis, the mount plane 13e of the inner tube 13 is pressed to the mount reference plane 5c of the inner mount 5 when the lens is mounted. Accordingly, the waterproof lens can be accurately mounted on the camera body without being affected by the dimensional variance due to machining and assembling works.

(5) Since the outer tube mount is arranged inside the O-ring 10, dust or sand does not deposit on the mount plane during the use and the mount plane will not be rubbed by the sand when the lens is mounted or removed.

(6) The lock mechanism 13f, 15 for defining the position in the rotating direction when the waterproof lens is mounted on the camera body is provided between the mount of the lens inner tube 13 which includes the lens and the iris mechanism, and the inner mount 5. Accordingly, the signal is positively transmitted between the waterproof lens and the camera body, and the relative positional relationship between the lens outer tube 7 and the lens inner tube 13 need not be very strict. As a result, the machining and assembling works are facilitated.

A second embodiment of the present invention is now explained.

Figure 7:
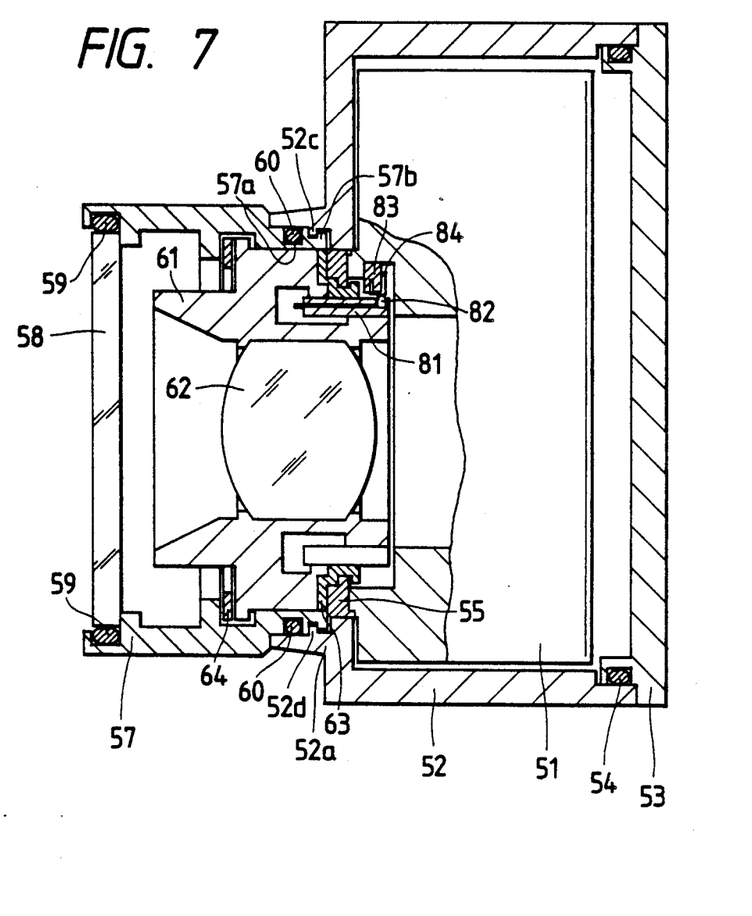
FIG. 7 shows a sectional view of a waterproof camera in accordance with a second embodiment of the present invention.

In FIG. 7, a drive mechanism 51 of the camera is housed in and supported by a waterproof and pressure-proof camera body which comprises an outer casing 52, a rear lid 53 and an O-ring which seals a clearance therebetween against water. It is supported in such a way that it is not affected even if the outer casing 52 or the rear lid 53 is deformed by an external pressure. The drive mechanism 51 has a hold mechanism for holding a film at a predetermined position behind the lens, a film wind-up mechanism and a shutter mechanism.

Figure 8:
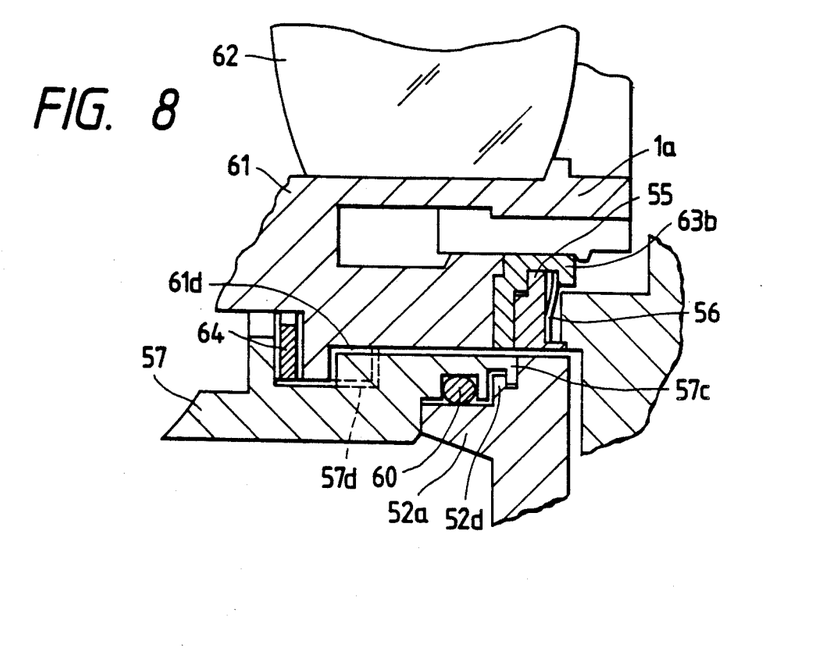
FIG. 8 shows a partial enlarged view of a lens mount shown in FIG. 7.
Figure 10:
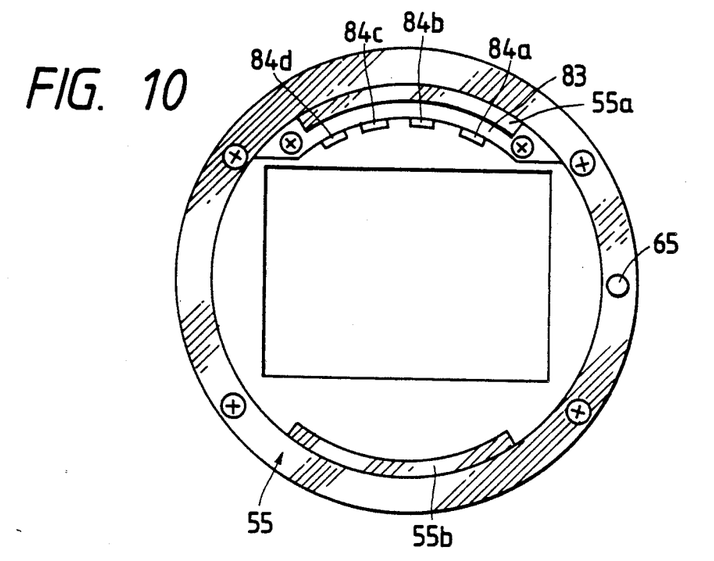
FIG. 10 shows a plan view of an inner mount of a camera body.

An inner mount 55 for mounting an imaging lens is provided on a front plane of the drive mechanism 51. A plurality of bayonet pawls 55a and 55b are provided in the inner mount 55 as shown in FIG. 10, and a plurality of leaf springs 56 for press-contacting a mount 63 of a lens inner tube to the inner mount 55 are provided as shown in FIG. 8.

Figure 9:
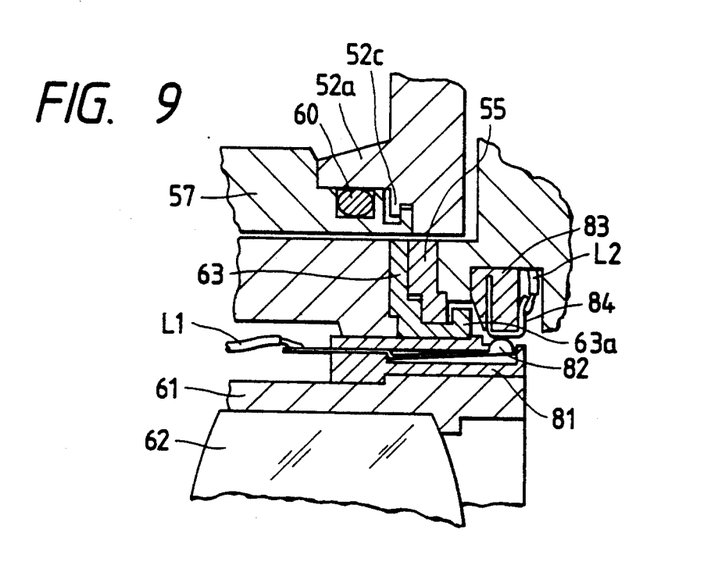
FIG. 9 shows a partial enlarged view of an electrical connector in a lens mount of FIG. 7.

Further, an insulative hold member 83 for holding a conductive connector contact member 84 is provided on inner side of the inner mount 55 as shown in FIG. 9. The contact member 84 is connected to an electrical circuit (not shown) in the camera body by a cord $L_2$ soldered to the contact member 84.

An outer mount 52a for mounting the lens bodytube is provided on the front of the outer casing 52, and a waterproof seal by the O-ring 60 and a plurality of outer bayonet pawls 52c and 52d are provided.

The structure of the lens bodytube is now explained.

In FIG. 7, a waterproof glass 57 is arranged in the front opening of the outer tube 57 so that the O-ring 59 seals the gap between the waterproof glass 58 and the outer tube 57 against water. A peripheral groove 57a in which an O-ring 60 is to be mounted and a plurality of bayonet pawls 57b and 57c for engaging with outer bayonet pawls 52c and 52d are provided on the rear of the outer tube 57.

The imaging lens 62, an iris control mechanism (not shown), a focusing control mechanism and an electric circuit to be connected to an electrical device in the camera body are arranged on the inner tube 61 and they are supported by the mount 63.

Figure 11:
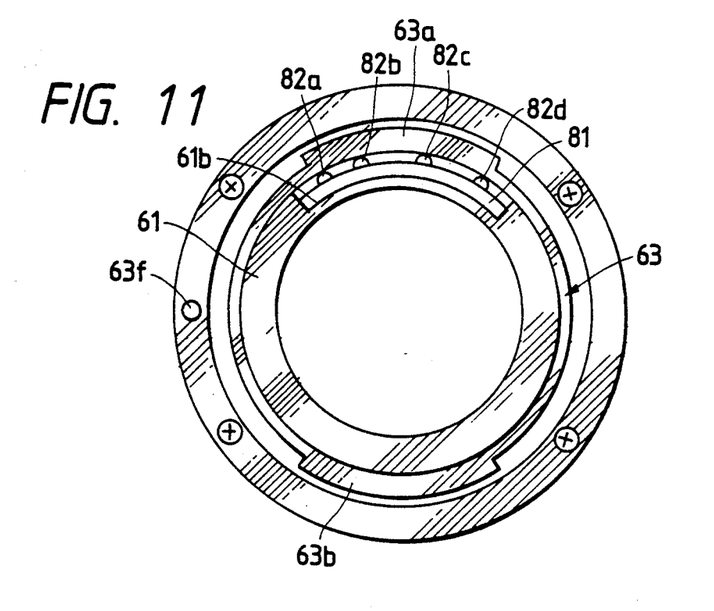
FIG. 11 shows a plan view of a mount of an inner tube of the lens bodytube.

The rear end of the inner tube 61 projects into the mount 63 as shown in FIGS. 7 and 9 to protect the rear end plane of the lens 62. The projecting portion has a notch 61b formed as shown in FIG. 11, and a non-conductive contact hold member 81 is inserted into the notch 61b as shown in FIG. 9. A conductive and resilient movable contact 82 is arranged on the hold member 81 and it is connected to an electrical circuit in the lens bodytube by a cord $L_1$. The movable contacts 82a–82d are arranged in an arcuate shape to form the movable contact 82 as shown in FIG. 11. The movable contact 82 and the hold member 81 are arranged in unit to form a connection. A plurality of bayonet pawls 63a and 63b are provided on the mount 63 as shown in FIG. 11. A ring-shaped leaf spring 64 is held between the outer tube 57 and the inner tube 61 to load the inner tube 61 and the outer tube 57 in the opposite directions along the optical axis.

As shown in FIG. 8, a recess 57d is formed in the outer tube 57 and a projection 61d is formed on the inner tube 61. They engage with each other to restrict the relative rotation between the inner tube and the outer tube. The inner tube is movable relative to the outer tube by a small amount along the optical axis. The amount of displacement is set to a distance along the optical axis which is required for the engagement of the bayonet pawls.

FIG. 10 shows a positional relationship between the bayonet pawls 55a and 55b of the inner mount of the camera and the hold member 83. The contact members 84a–84d held by the hold member are arranged in an arcuate shape. The lock pin 65 is provided on the inner mount 55 movably along the optical axis.

FIG. 11 shows a mutual positional relationship between the bayonet pawls of the mount 63 of the inner tube and the movable contacts 82a–82d. A recess 63f of the mount 63 is formed to face the lock pin 65 of FIG. 10. At the completion of the mounting of the lens bodytube, one end 65a of the lock pin 65 falls into the recess 63f as shown in FIG. 12 to lock the lens bodytube against the rotation.

Figure 12:
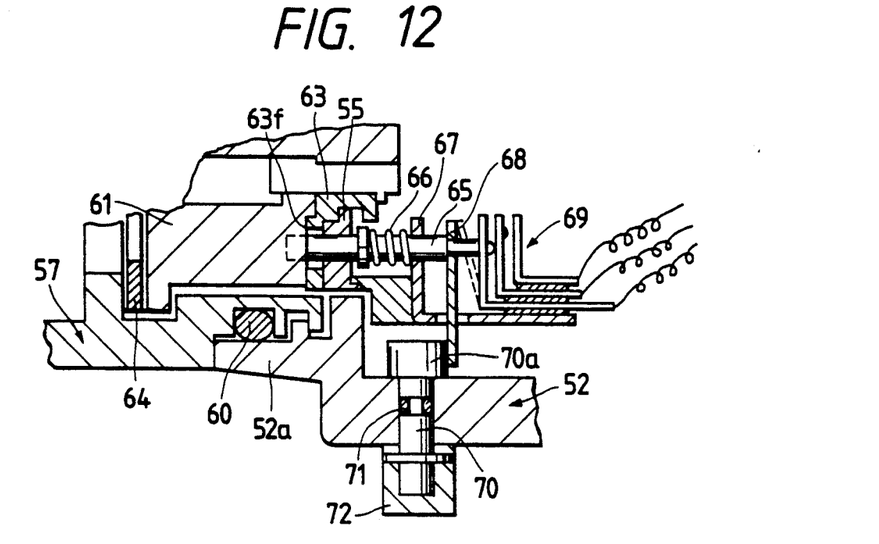
FIG. 12 shows a sectional view of a lens bodytube lock unit of the lens mount immediately after the lens bodytube has been mounted.
Figure 13:
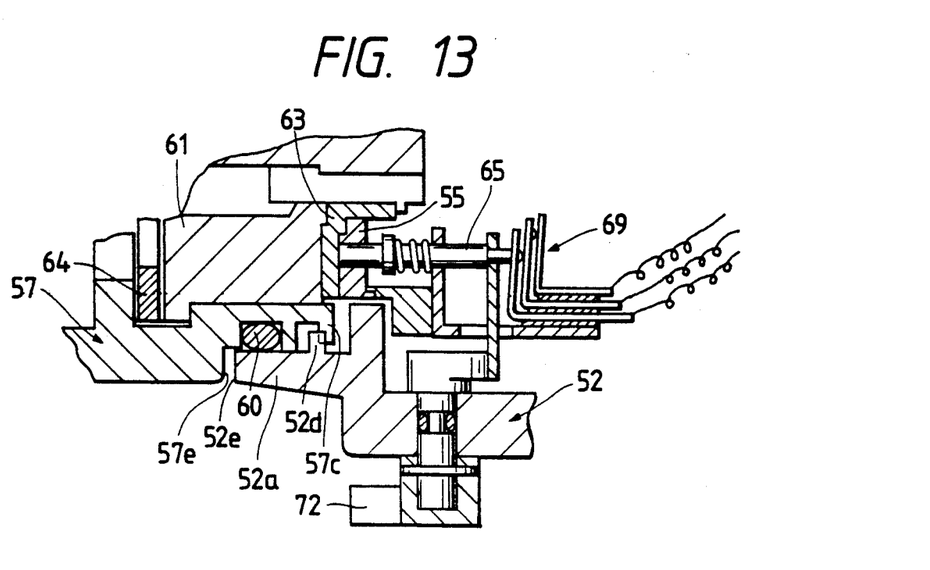
FIG. 13 shows a sectional view of the lens bodytube lock unit of the lens mount before the lens bodytube is mounted.

In FIGS. 12 and 13, the lock pin 65 extends through the inner mount 55 and the axial hole formed in the support member 67, and it is biased leftward in FIG. 12 by a compressed coiled spring 66. The cam lever 68 is fixed to the lock pin 65 and abuts against a cam surface 70a which is fixed at one end of a cam shaft 70. The cam shaft 70 is rotatably supported by the outer casing 52, and an O-ring 71 is mounted in a middle peripheral groove of the cam shaft 70 to seal the gap between the cam shaft 70 and the outer casing 52 against water. A lens removal lever 72 is fixed to the other end of the cam shaft 70. A switch 69 which comprises a stationary contact and two movable contacts are arranged at the other end of the lock pin 65, and it is connected to a contact circuit of the camera body.

The mount operation of the lens bodytube to the camera body is now explained.

FIG. 13 shows a state immediately after the mount of the lens bodytube has been inserted into the mount of the camera body. Under this state, the bayonet pawls of the lens and the camera body, and the lock pin 65 and the recess 63f are in the non-engagement position with 90 degrees displacement. The movable contacts 82a–82d and the contacts 84a–84d are also in the non-engagement position. Under this state, the outer tube 57 is pressed rightward in FIG. 13 against the force of the spring 64 so that the mount of the outer tube 57 is inserted into the outer mount 52a of the outer casing 52 and the O-ring 60 is elastically deformed to seal therebetween against water.

The end plane of the mount 63 of the inner tube is pressed to the end plane of the inner mount 55 by the biasing force of the spring 64 to push the lock pin 65 rightward so that the switch 69 is turned on. In the state of FIG. 13, the outer bayonet pawls 52c and 52d and the outer tube bayonet pawls 57b and 57c interfere each other in the rotating direction. As a result, the lens bodytube cannot be rotated relative to the camera body. However, when the outer tube 57 is further pressed rightward in FIG. 13 against the biasing force of the spring 14, the interference is totally removed at a point where the end plane 57e of the outer tube 57 abuts against the end plane 52e of the outer casing 52, and the lens bodytube is now rotatable. Under this status, when the lens bodytube is rotated by a predetermined angle (for example, 90 degrees), the mount completion state shown in FIG. 12 is attained. The respective elements are in the relative positions shown in FIGS. 10 and 11, and the bayonet pawls 63a and 55a, 63b and 55b, 57b and 52c, and 57c and 52d engage with each other, respectively. One end of the lock pin 65 falls into the recess 63f of the mount 63 as shown in FIG. 12 to lock the lens bodytube against the rotation. The spring 66 presses the inner tube bayonet pawls 63a and 63b rightward in FIG. 8 to make the end plane 63e of the mount 63 to contact to the mount plane 55c. As a result, the inner tube 61 and the drive mechanism 51 are integrated in the rotating direction and the optical axis direction. The bayonet pawls 57b and 57c of the outer tube and the outer bayonet pawls 52c and 52d of the outer casing 52 are also engaged with each other, respectively, so that the outer tube 57 is engaged with and held by the outer casing 52. The movable contacts 82a–82d shown in FIG. 11 resiliently contact to the contacts 84a–84d shown in FIG. 10 to make an electrically conductive state.

Where the lens bodytube is not mounted on the lock pin 65, the lock pin 65 projects leftward to the broken line position in FIG. 12 by the biasing force of the spring 66. As a result, the two movable contacts and the stationary contact of the switch 69 are separated from each other and the switch is in the off-state. When the lens bodytube is inserted into the outer mount 52a as shown in FIG. 13, the two movable contacts and the stationary contact make contact to each other and the switch 69 assumes a first on-state. In a perfectly mounted state shown in FIG. 12, the switch 69 assumes a second on-state in which only the two movable contacts make contact to each other and separate signals are transmitted to the camera body mechanism 51.

When the lens bodytube is to be removed from the camera body, the removal lever 72 is rotated and the cam lever 68 is moved rightward in FIG. 12 by the cam surface 70a of the shaft 70 so that the engagement of the lock pin 65 and the recess 63f of the inner tube mount 63 is released. Thereafter, the lens outer tube 57 is rotated in the opposite direction to that when the lens is mounted.

In accordance with the second embodiment of the present invention, a biasing force sufficient to press the mount 63 of the lens inner tube to the inner mount 55 of the camera body is applied to the spring 56. Therefore, the contact between the contact 84 and the movable contacts 82 between the camera body and the lens bodytube is effected in a stable manner.

Further, in the second embodiment, the connector contacts 82 and 84 are arranged inside of the inner mount 55. Therefore, when the lens is mounted or removed, water drop, sand or dust is hard to deposit and more safeguard for the electrical conduction is assured.

I claim:

1. A waterproof camera having a detachable imaging lens system, comprising:
   an inner tube for holding the imaging lens system;
   a waterproof optical member for covering a front of said imaging lens system;
   an outer tube for holding said waterproof optical member and supporting said inner tube therein such that said inner tube is displaceable by a predetermined distance only along an optical axis;
   an inner support member for supporting imaging means;
   an outer casing for holding said inner support member therein;
   a first bayonet mount arranged in said outer casing for removably supporting one end of the outer tube;
   a second bayonet mount arranged in said inner support member to removably support said inner tube and having a reference plane for determining a position of said imaging lens system of said inner tube along the optical axis;
   spring means arranged between said outer tube and said inner tube for biasing said inner tube toward the reference plane of said second bayonet mount when said outer tube is mounted on said outer casing through said first bayonet mount; and
   waterproof seal means provided between said outer tube and said first bayonet mount.

2. A waterproof camera according to claim 1 wherein said inner tube has a plurality of bayonet pawls, said second bayonet mount has a plurality of bayonet pawls for coupling to the bayonet pawls of said inner tube and a plurality of leaf springs provided one for each of said bayonet pawls for pressing said inner tube toward the reference plane of said second bayonet mount.

3. A waterproof camera according to claim 1 further comprising:
   a connection including a first contact and a second contact for electrically connecting said inner tube and said inner support member, wherein said first contact is arranged in said second bayonet mount, and said second contact is arranged in said inner tube.

4. A waterproof camera according to claim 1 further comprising:
   detection means for detecting a mount state of said inner tube and said second bayonet mount.

5. A waterproof camera according to claim 4 wherein said detection means includes a movable member and a groove arranged at positions to face each other when said inner tube is completely mounted in said second bayonet mount, and switch means engaged with said movable member to produce an electrical signal in accordance with the displacement distance of said movable member.

6. A waterproof camera with a detachable lens bodytube for holding an inner tube for holding an imaging lens system and a waterproof optical system for covering a front of said imaging lens system and having an outer tube for holding said inner tube therein, comprising:
   an inner support member for holding imaging means;
   an outer casing for supporting said inner support member therein;
   a first bayonet mount arranged in said outer casing and adapted to be coupled with said outer tube;
   a second bayonet mount arranged in said inner support member and adapted to be coupled to said inner tube; and
   link means arranged between said outer tube and said inner tube for linking the coupling of said outer tube to said first bayonet mount and the coupling of said inner tube to said second bayonet mount.

7. A waterproof camera with a detachable lens bodytube having an inner tube for holding an imaging lens system, an outer tube for holding said inner tube therein and an electrically driven electrical device, comprising:
   an inner support member for holding imaging means;
   an outer casing for supporting said inner support member therein;
   a first bayonet mount arranged in said outer casing and adapted to be coupled to said outer tube;
   a second bayonet mount arranged in said inner support member and adapted to be coupled to said inner tube; and
   a connector arranged in said inner support member and adapted to be connected to said electrical device when said inner tube is coupled to said second bayonet mount.

8. An imaging lens bodytube adapted to be mounted on a waterproof camera having an inner support member for holding imaging means and an outer casing for holding said inner support member therein, comprising:
   an imaging lens system;
   an inner tube member for holding said imaging lens system and having a bayonet pawl member at an end thereof for coupling to said inner support member;
   a waterproof optical member for covering a front of said imaging lens system;
   an outer tube member for holding said waterproof optical member and having a bayonet pawl member at one end thereof for coupling to said outer casing and supporting said inner tube member therein; and
   link means arranged between said outer tube member and said inner tube member for linking the coupling of said outer tube member to said outer casing and the coupling of said inner tube member to said inner support member.

9. An imaging lens bodytube adapted to be mounted on a waterproof camera having an inner support member for holding imaging means, an outer casing for holding said inner support member therein, and an electrical driver, comprising:

an imaging lens system;

an inner tube member for holding said imaging lens system and having a bayonet pawl member at one end thereof for coupling to said inner support member;

a lens outer tube having a bayonet pawl member at one end thereof for coupling to said outer casing and supporting said inner tube member therein;

link means arranged between said outer tube member and said inner tube member for linking the coupling of said outer tube member to said outer casing and the coupling of said inner tube member to said inner support member; and a connector arranged in said inner tube member adapted to be connected to said electrical driver when said inner tube member is coupled to said inner support member.

* * * * *